United States Patent
Choi et al.

(10) Patent No.: US 9,142,850 B2
(45) Date of Patent: Sep. 22, 2015

(54) TRI-BLOCK COPOLYMER AND ELECTROLYTE MEMBRANE MADE FROM THE SAME

(71) Applicant: LG CHEM, LTD., Seoul (KR)

(72) Inventors: Seong Ho Choi, Daejeon (KR); Hyuk Kim, Daejeon (KR); Sang Woo Lee, Daejeon (KR); Tae Geun Noh, Daejeon (KR); Ji Soo Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 197 days.

(21) Appl. No.: 14/036,491

(22) Filed: Sep. 25, 2013

(65) Prior Publication Data

US 2014/0023949 A1 Jan. 23, 2014

Related U.S. Application Data

(63) Continuation of application No. 13/820,920, filed as application No. PCT/KR2010/008306 on Nov. 24, 2010, now Pat. No. 9,048,479.

(30) Foreign Application Priority Data

Sep. 14, 2010 (KR) .......................... 10-2010-0090221

(51) Int. Cl.

| | | |
|---|---|---|
| *H01M 8/10* | (2006.01) | |
| *C08J 5/22* | (2006.01) | |
| *C08G 61/12* | (2006.01) | |
| *C08L 71/00* | (2006.01) | |
| *C08L 81/06* | (2006.01) | |
| *H01M 8/24* | (2006.01) | |
| *C08G 65/40* | (2006.01) | |

(52) U.S. Cl.
CPC ............... *H01M 8/103* (2013.01); *C08G 61/12* (2013.01); *C08G 65/4056* (2013.01); *C08J 5/2256* (2013.01); *C08L 71/00* (2013.01); *C08L 81/06* (2013.01); *H01M 8/1018* (2013.01); *H01M 8/1027* (2013.01); *H01M 8/1032* (2013.01); *H01M 8/1037* (2013.01); *H01M 8/2465* (2013.01); *C08G 2261/126* (2013.01); *C08G 2261/344* (2013.01); *C08G 2261/516* (2013.01); *C08G 2650/40* (2013.01); *C08J 2381/06* (2013.01); *H01M 2008/1095* (2013.01); *Y02E 60/521* (2013.01)

(58) Field of Classification Search
None
See application file for complete search history.

(56) References Cited

U.S. PATENT DOCUMENTS

2009/0191442 A1  7/2009  Hoshikawa et al.

FOREIGN PATENT DOCUMENTS

| JP | 2004-339422 A | 12/2004 |
|---|---|---|
| JP | 2005-220271 A | 8/2005 |
| JP | 2006-252813 | 9/2006 |
| JP | 2006-312742 A | 11/2006 |
| JP | 2008-542478 A | 11/2008 |
| JP | 2009-504807 A | 2/2009 |
| JP | 2009-259796 A | 11/2009 |
| KR | 10-2008-0045881 | 5/2008 |
| KR | 10-2009-0036796 | 4/2009 |
| KR | 10-2009-0088646 | 8/2009 |
| KR | 10-2010-0050423 | 5/2010 |

OTHER PUBLICATIONS

STIC Search Performed Apr. 4, 2014 in Parent U.S. Appl. No. 13/820,920.*

* cited by examiner

*Primary Examiner* — Sarah A Slifka
(74) *Attorney, Agent, or Firm* — Dentons US LLP

(57) ABSTRACT

Provided are a tri-block copolymer and an electrolyte membrane prepared therefrom. The tri-block copolymer has a structure of polar moiety-containing copolymer block/non-polar moiety-containing copolymer block/polar moiety-containing copolymer block, or non-polar moiety-containing copolymer block/polar moiety-containing copolymer block/non-polar moiety-containing copolymer block, and is useful for an electrolyte membrane for fuel cells. The electrolyte membrane for fuel cells prepared from the tri-block copolymer exhibits superior dimensional stability and excellent fuel cell performance.

15 Claims, 1 Drawing Sheet

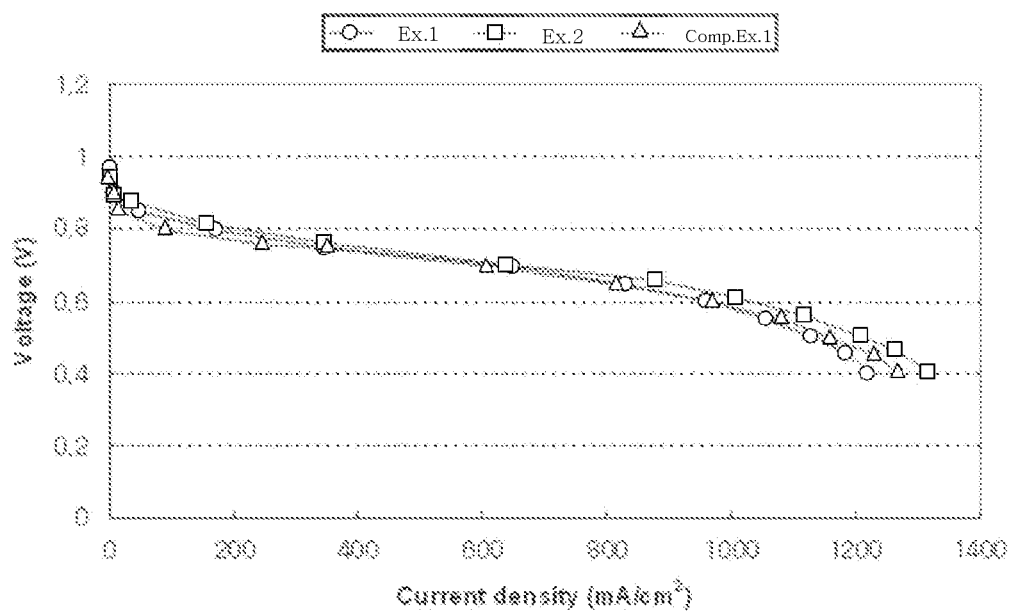

TRI-BLOCK COPOLYMER AND ELECTROLYTE MEMBRANE MADE FROM THE SAME

This application is a continuation of U.S. application Ser. No. 13/820,920, filed Mar. 5, 2013, which is a National Stage Entry of International Application No. PCT/KR2010/008306, filed Nov. 24, 2010, and claims the benefit of Korean Patent Application No. 10-2010-0090221 filed on Sep. 14, 2010 all of which are hereby incorporated by reference in their entirety for all purposes as if fully set forth herein.

TECHNICAL FIELD

The present invention relates to a tri-block copolymer and an electrolyte membrane prepared therefrom. More specifically, the present invention relates to a tri-block copolymer, an electrolyte membrane prepared therefrom and a fuel cell, to which the electrolyte membrane is applied, which may be used for an electrolyte membrane of fuel cells useful for distributed generation plants, cogeneration plants, pollution-free vehicle power, power for business, household power and mobile equipment powers and the like.

BACKGROUND ART

Recently, the predicted exhaustion of conventional energy sources such as oil and coal has brought about an increasing interest in alternative energy sources. In particular, a fuel cell, as an energy storage system, is advantageous in that it is highly efficient, does not discharge pollutants such as $NO_x$ and $SO_x$, and the fuel used is abundant, and thus attracts much attention.

A fuel cell is a power generation system which converts chemical bond energy of a fuel and an oxidizing agent into electric energy. Typically, hydrogen, methanol or hydrocarbons such as butane are used as the fuel and oxygen is used as the oxidizing agent.

The most basic unit to generate electricity in the fuel cell is a membrane electrode assembly (MEA), which is composed of an electrolyte membrane, and an anode electrode and a cathode electrode formed on both surfaces of the electrolyte membrane. Referring to Reaction Scheme I illustrating a mechanism via which a fuel cell generates electricity (reaction scheme of the fuel cell in the case where hydrogen is used as the fuel), in the anode electrode, oxidation occurs to produce hydrogen ions and electrons and the hydrogen ions move through the electrolyte membrane to the cathode electrode. In the cathode electrode, oxygen (oxidizing agent), the hydrogen ions transferred through the electrolyte membrane react with electrons to produce water. Based on these reactions, electron transfer occurs in an external circuit.

At anode electrode: $H_2 \rightarrow 2H^+ + 2e^-$ 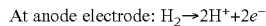

At cathode electrode: $\frac{1}{2}O_2 + 2H^+ + 2e^- \rightarrow H_2O$ 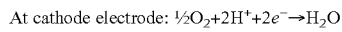

Overall reaction: $H_2 + \frac{1}{2}O_2 \rightarrow H_2O$     [Reaction Scheme I] 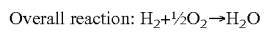

Among fuel cells, a proton exchange membrane fuel cell (also referred to as a "polymer electrode membrane fuel cell", PEMFC) provides high energy efficiency, high current density and power density, short driving period and rapid response to load variation. The proton exchange membrane fuel cell utilizes a proton exchange membrane and requires high proton conductivity, chemical stability, thermal stability at an operating temperature, low gas permeability, and in particular, superior mechanical strength as a membrane.

Although membranes satisfying these requirements have been developed, clean manufacturing technology for the production of price competitive membranes is needed to make commercialization possible. Fluorine-based membranes such as Nafion (manufactured by Du Pont), Aciplex (manufactured by Dow membrane or Asahi Chemical) have disadvantages of decreased proton conductivity and high production cost in a low-humidity and high-temperature process. Accordingly, a great deal of research associated with non-fluorine polymers in which a polar group is introduced into a heat-resistant polymer as a base skeleton to provide functionalities of polymer electrolytes is actively made. Of these, poly(arylene ether) polymers having aromatic derivatives and ether bonds exhibit good heat resistance and chemical resistance, superior mechanical strength, excellent durability and low production costs.

However, dimensional stability, in consideration of the fact that polymer electrolyte membranes of fuel cells generate large amount of water, is a very important factor to be contemplated. Commonly, an electrolyte membrane should have a high ion exchange capacity (IEC) in order to have a high ionic conductivity. However, since ion exchange capacity (IEC) of the electrolyte membrane is directly related to water uptake, as water uptake increases, ion exchange capacity increases. As a result, dimension stability is deteriorated and film thickness increases, thus disadvantageously deteriorating overall performance of cells.

However, non-fluorine polymer membranes which efficiently solve the problem of dimensional stability, while maintaining superior performance, have been not yet known.

DISCLOSURE

Technical Problem

Therefore, the present invention has been made to solve the above problems and other technical problems that have yet to be resolved.

As a result of a variety of extensive and intensive studies and experiments to solve the problems as described above, the inventors of the present invention developed, as described below, a tri-block copolymer which has a structure in which copolymer blocks containing a polar moiety are alternately linked to copolymer blocks containing a non-polar moiety and has a weight average molecular weight of 100,000 to 1,000,000 g/mol, and discovered that superior cell performance can be maintained and dimensional stability can be improved in the case of using the tri-block copolymer.

The present invention was completed based on this discovery.

Technical Solution

In accordance with one aspect of the present invention, provided is a tri-block copolymer as a polymer electrolyte membrane for fuel cells, which has a molecular structure of t-P-N-P-t or t-N-P-N-t, in which t represents an end of the polymer formed by an end-forming monomer, p represents a copolymer block having a polar moiety, and N represents a copolymer block having a non-polar moiety and the tri-block copolymer a weight average molecular weight of 100,000 to 1,000,000 g/mol.

The tri-block copolymer of the present invention has a polar-nonpolar-polar or nonpolar-polar-nonpolar copolymer block alignment.

The tri-block copolymer is composed of three blocks, since it is prepared from an end-forming monomer. In the case where an end-forming monomer is not used, a multi-block copolymer in which a plurality of blocks containing a polar moiety are alternately linked to a plurality of blocks containing a non-polar moiety is formed. It was found that this multi-block copolymer cannot exert the desired physical properties of the present invention.

The tri-block copolymer of the present invention may have a variety of molecular weights, depending on the specific kind of monomers used and polymerization conditions. The weight average molecular weight of tri-block copolymer is preferably 100,000 to 1,000,000 g/mol. When the weight average molecular weight is less than 100,000 g/mol, it is difficult to form a film or, although possible, the mechanical properties of the film may be poor. When the weight average molecular weight exceeds 1,000,000 g/mol, it is difficult to disperse the polymer in a solvent and processiblity may be deteriorated.

The tri-block copolymer of the present invention has a structure of t-P-N-P-t or t-N-P-N-t. The copolymer block containing a polar moiety (P) is hydrophilic, thus contributing to ionic conductivity, and the copolymer block containing a non-polar moiety (N) is hydrophobic and thus enhances mechanical properties. Accordingly, those skilled in the art will suitably select one of the two types of tri-block copolymers for electrolyte membranes, depending on the specific application and operating environment.

In a preferred embodiment, P represents a copolymer block represented by Formula 1 below and N represents a copolymer block represented by Formula 2 below:

  (1)

  (2)

wherein A, C and V are each independently at least one selected from the group consisting of:

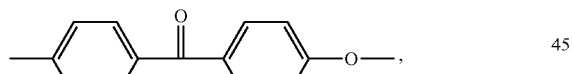

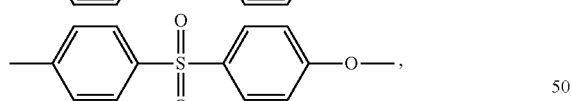

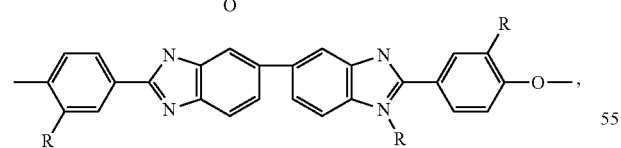

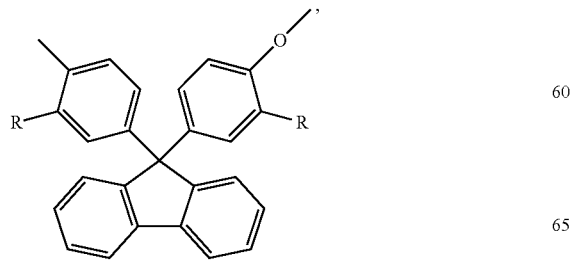

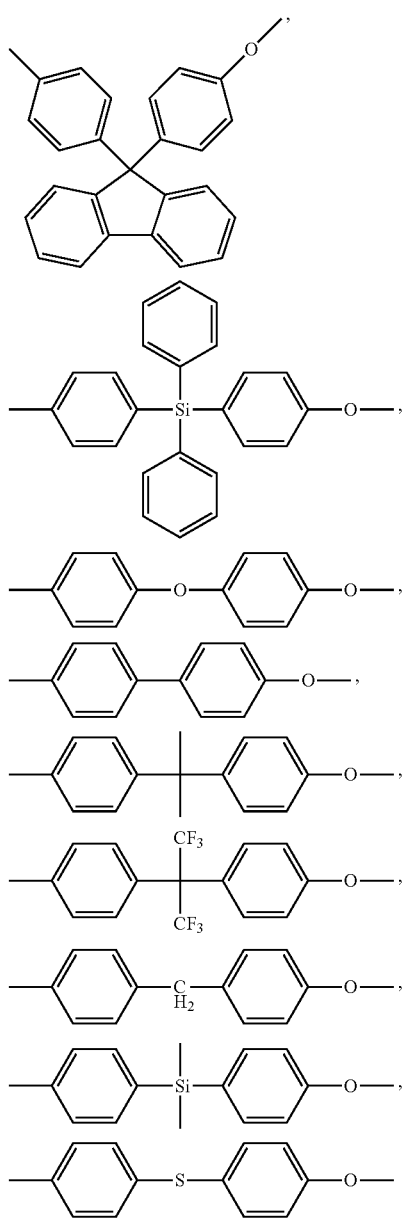

R is —NO$_2$ or —CF$_3$;

U is at least one selected from the group consisting of:

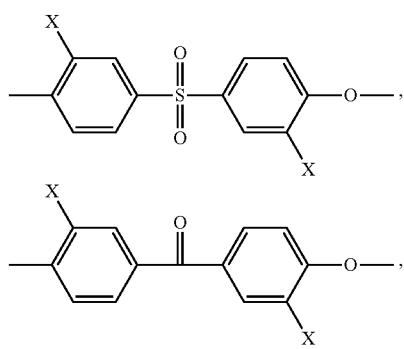

-continued

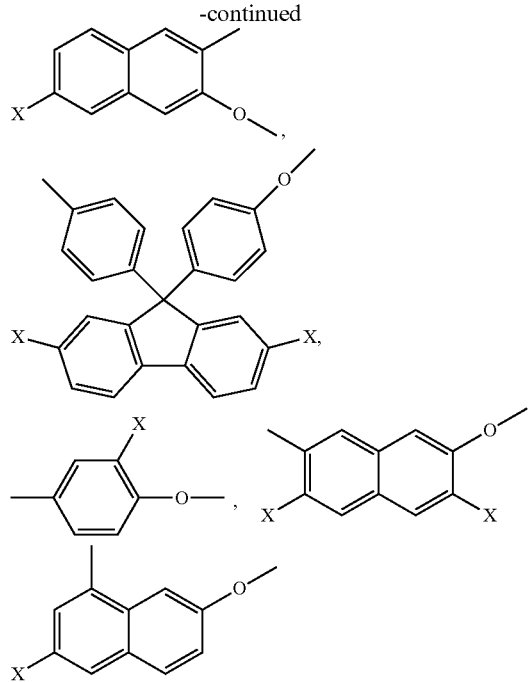

X is —SO₃H, —SO₃⁻M⁺, —COOH, —COO⁻M⁺ or —PO₃²⁻2M⁺;

M is Na or K;

B is at least one selected from the group consisting of:

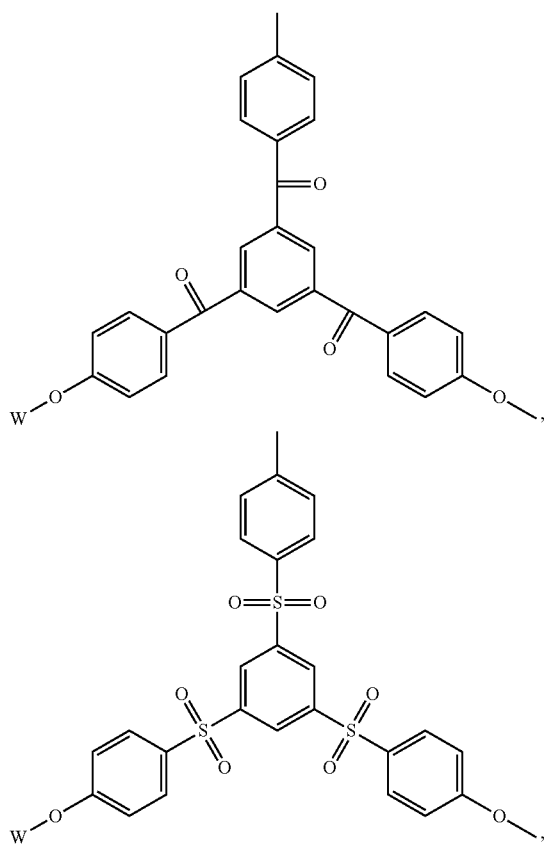

-continued

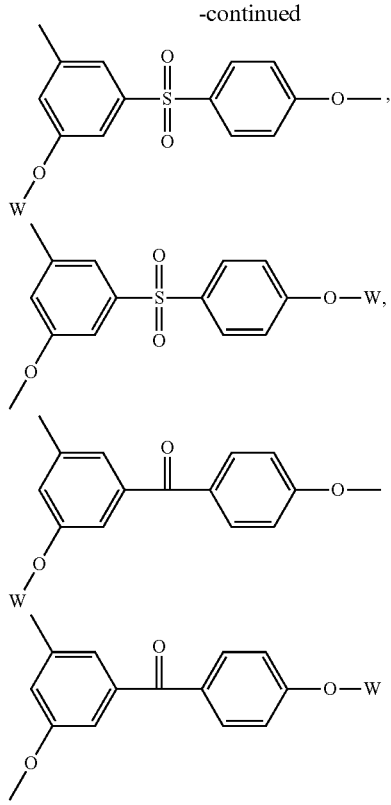

W is the same as defined in U in Equation 1 and V in Equation 2;

x:y is 1000:1 to 5:1 and a:b is 1000:1 to 5:1; and

10≤m≤2000 and 5≤n≤800.

The tri-block copolymer of the present invention has lower ion exchange capacity than a multi-block copolymer and thus exhibits superior dimensional stability. On the other hand, contrary to the assumption that performance of cells will be deteriorated due to the low ion exchange capacity, performance of cells can be maintained, as can be seen from the following examples. The reason for this phenomenon, although not clear, is that, although copolymers are composed of blocks prepared from the same monomer, the morphology of polymers prepared may vary depending on the shape of the block and that the morphology of the tri-block copolymer of the present invention is different from that of the multi-block copolymer.

B has a side chain as well as a main chain. The content of the side chain with respect to the total amount of tri-block copolymer may be determined, based upon a molar ratio of y and b.

The inventors of the present invention found that physical properties of a copolymer varying considerably depending upon the content of side chain. Accordingly, the tri-block copolymer of the present invention preferably has a specific ratio of x:y and a:b. Specifically, when the molar ratio of y to x is less than 0.001, the side chain has almost no effect upon the polymer as a whole, and when the ratio exceeds 0.2, dispersibility of polymer dispersed in a solvent is considerably deteriorated.

For the tri-block copolymer of the present invention, the end-forming monomer on the end (t) of the polymer refers to a monomer which has one functional group which can react with other monomers (or polymer chains). Accordingly, in the polymerization process, growth of polymer chains is ceased in a region in which a bond with the end-forming monomer is formed.

For example, the end-forming monomer is at least one selected from the group consisting of p-cresol, phenoxy, benzophenone and methoxy groups.

The weight average molecular weight of the trio-block copolymer may represent a total of the molecular weight of the non-polar moiety-containing block and the molecular weight of the polar moiety-containing block and may be determined by m, n, x, y, a and b. Accordingly, the weight average molecular weight of the trio-block copolymer may be chosen depending on the specific application of polymers. For example, in the case where the trio-block copolymer is used as an electrolyte membrane for fuel cells, the tri-block copolymer may be prepared by varying m, n, x, y, a and b depending on the desired ionic exchange capacity of the copolymer.

In a preferred embodiment, the weight average molecular weight of the polar moiety-containing copolymer block may be 3,500 to 350,000 g/mol and the weight average molecular weight of the nonpolar moiety-containing copolymer block may be 3,000 to 400,000 g/mol.

When the molecular weight of polar moiety-containing copolymer block is less than 3,500 g/mol, mechanical strength may be deteriorated during film manufacture. When the molecular weight of polar moiety-containing copolymer block exceeds 400,000 g/mol, dispersibility of copolymer in a solvent may be deteriorated and processiblity may thus be degraded.

The tri-block copolymer of the present invention may be prepared by preparing a polar moiety-containing copolymer block having an end-forming monomer, and then preparing a non-polar moiety-containing copolymer block and, at the same time, reacting the non-polar moiety-containing copolymer block with the polar moiety-containing copolymer block to prepare a tri-block copolymer having a structure of t-P-N-P-t. Alternatively, the tri-block copolymer may be prepared by preparing a nonpolar moiety-containing copolymer block having an end-forming monomer, and then preparing a polar moiety-containing copolymer block and, at the same time, reacting the polar moiety-containing copolymer block with the non-polar moiety-containing copolymer block to prepare a tri-block copolymer having a structure of t-N-P-N-t.

In one embodiment, a method for preparing the trio-block copolymer of the present invention in the form of t-P-N-P-t will be described below.

First, a bisphenol monomer or an aromatic dihalogen monomer; a phenol monomer having an acid-substituent or a bisphenol monomer having an acid-substituent; or an aromatic dihalogen monomer having an acid-substituent, an end-forming monomer and a monomer having a side chain were dissolved in an organic solvent and polymerized in the presence of a catalyst to prepare a polar moiety-containing copolymer block containing an end-forming monomer (S1).

In this step, when a small amount of end-forming monomer with respect to the amount of monomer for forming the copolymer block is added, a polymer block bonded to the end-forming monomer on one end thereof can be obtained. Since, in the process of preparing the polar moiety-containing copolymer block in step (S1), the end-forming monomer (t) is added, a t-P type of polar moiety-containing copolymer block in which the end-forming monomer is linked to one end thereof can be obtained.

Any amount of the end-forming monomer may be added so long as polymer block growth is no inhibited. For example, the content of end-forming monomer may be 0.005 to 0.1 moles with respect to one mole of one monomer selected from a bisphenol monomer or aromatic dihalogen monomer added in the same process; and a phenol monomer having an acid substituent, a bisphenol monomer having an acid substituent or an aromatic dihalogen monomer, but is not limited thereto.

Examples of useful bisphenol monomers include, but are not limited to, 4,4-biphenol, 9,9-bis(4-hydroxyphenyl)fluorene) and combinations thereof.

Examples of useful aromatic dihalogen monomers include, but are not limited to, 4,4'-difluorobenzophenone, bis(4-fluorophenyl)sulfone, 2,2-bis(4-hydroxyphenyl)hexafluoropropane and combinations thereof.

The phenol monomer having an acid substituent, bisphenol monomer having an acid substituent and aromatic dihalogen monomer are a phenol monomer in which at least one acid substituent is present in a phenyl ring, a bisphenol monomer in which at least one acid substituent is present in a phenyl ring and an aromatic dihalogen monomer in which at least one acid substituent is present in a phenyl ring, respectively. Examples of these monomers include, but are not limited to, hydroquinonesulfonic acid potassium salts, 2,7-dihydronaphthalene-3,6-disulfonic acid disodium salts, 1,7-dihydroxynaphthalene-3-sulfonic acid monosodium salts, potassium 5,5'-carbonylbis(2-fluorobenzene sulfonate)), potassium 2,2'-[9,9-bis(4-hydroxyphenyl)fluorene]sulfonate and combinations thereof. Of these, 5,5'-carbonylbis(2-fluorobenzene sulfonate)) may be prepared by directly sulfonating 4,4'-difluorobenzophenone and 4,4'-difluorodiphenyl sulfone with fuming sulfuric acid, and potassium 2,2'-[9,9-bis (4-hydroxyphenyl)fluorene]sulfonate may be prepared by directly sulfonating 9,9-bis(4-hydroxyphenyl)fluorene with $ClSO_3H$.

The monomer containing a side chain that can be used in the present invention directly constitutes a main chain of the tri-block copolymer and examples thereof include, but are not limited to, [3,5-bis(4-fluorobenzoyl)phenyl](4-fluorophenyl)methanone, 3,5-difluoro-4'-fluorobenzophenone, (3,5-difluoro-4'-fluorophenyl)sulfone and combinations thereof. Of these, [3,5-bis(4-fluorobenzoyl)phenyl](4-fluorophenyl) methanone) may be prepared by Friedel-Crafts reaction of 1,3,5-benzenetricarbonyltrichloride, aluminum chloride and fluorobenzene. The monomer containing other chains may also be prepared by a similar Friedel-Crafts reaction.

The organic solvent that can be used for the polymerization of the polar moiety-containing copolymer block and/or non-polar moiety-containing copolymer block is not particular limited so long as it is capable of easily dissolving reactants and products. In particular, examples of the organic solvent include N,N-dimethylacetamide (DMAc), N-methyl pyrrolidone (NMP), dimethyl sulfoxide (DMSO), N,N-dimethylformamide (DMF) and combinations thereof.

Any catalyst generally used in the art may be used in monomer polymerization to obtain the polar moiety-containing copolymer block and/or non-polar moiety-containing copolymer block. A carbonate catalyst is commonly used, but the present invention is not limited thereto. Examples of carbonate catalysts include, but are not limited to, sodium carbonate, potassium carbonate, rubidium carbonate, magnesium carbonate, calcium carbonate, barium carbonate and combinations thereof.

As described above, when respective components to prepare the polar moiety-containing copolymer block are prepared, monomers and catalysts are dissolved in an organic solvent, stirred at 140 to 150° C. for 3 to 5 hours and water is removed from the mixture. Water may be removed in the form of an azeotrope. In this case, water may form an azeotrope with benzene or toluene. A common Dean-Stark trap may be used for removing the azeotrope. After the azeotrope is removed, the reaction temperature is elevated and stirring is performed at 170 to 190° C. for 6 to 24 hours as described above, to perform polymerization and thereby obtain a polar moiety-containing copolymer block having an end-forming monomer.

Then, the polar moiety-containing copolymer block having an end-forming monomer prepared in step (S1), a bisphenol monomer, an aromatic dihalogen monomer, and a monomer having a side chain were dissolved in an organic solvent, polymerized in the presence of a catalyst to prepare a non-polar moiety-containing copolymer block and, at the same time, prepare a tri-block copolymer (S2).

Both ends of the non-polar copolymer block may undergo coupling reaction with one end of the polar moiety-containing copolymer block having an end-forming monomer in which the end-forming monomer is not linked. The coupling reaction enables preparation of the final tri-block copolymer (t-P-N-P-t) in which the polar moiety copolymer block (P) is chemically linked to both ends of non-polar moiety copolymer block (N). As described above, coupling reaction of the polar moiety-containing copolymer block with the non-polar moiety-containing copolymer block in order to obtain the tri-block copolymer of the present invention may be carried out simultaneously with preparation of the non-polar moiety-containing copolymer block.

When the monomers for forming the non-polar moiety-containing copolymer block are prepared, the non-polar moiety-containing copolymer block and the tri-block copolymer of the present invention may be prepared in accordance with the same reaction conditions and processes as the method for preparing the polar moiety-containing copolymer block. For example, after polymerization of the polar moiety-containing copolymer block, the resulting product is diluted, filtered and washed to separate the polar moiety-containing copolymer block, a flask containing the polar moiety-containing copolymer block is cooled to 50 to 70° C. and monomers for the polar moiety-containing copolymer block are further added thereto to perform polymerization.

Specifically, the monomers for forming non-polar and polar moiety-containing copolymer blocks and catalysts are dissolved/dispersed in an organic solvent, stirred at 140 to 150° C. for 3 to 5 hours and water is removed from the mixture. Water may be removed in the form of an azeotrope. In this case, water may form an azeotrope with benzene or toluene. A common Dean-Stark trap may be used for removing the azeotrope. After the azeotrope is removed, the reaction temperature is elevated and stirring is performed at 170 to 190° C. for 6 to 24 hours as described above, to perform polymerization.

After completion of polymerization, the resulting product is directly added to distilled water, methanol or acetone, or diluted with distilled water, methanol or acetone, and filtered to remove salts present in the product to obtain a polymer slurry. Then, the slurry was filtered, repeatedly washed with hot distilled water (~80° C.) and/or methanol to obtain neutral pH and filtered to obtain a tri-block block copolymer.

In addition, as described above, as to a method for preparing the tri-block copolymer, preparation order of the polar moiety-containing copolymer block and non-polar moiety-containing copolymer block may be arbitrarily selected. Accordingly, after the non-polar moiety-containing copolymer block to which an end-forming monomer is linked is prepared, the polar moiety-containing copolymer block may be prepared. In this case, the tri-block copolymer in the form of t-N-P-N-t may be obtained.

The present invention also provides an electrolyte membrane comprising the tri-block copolymer in which N, Na or K, is substituted by H.

In Formulae 1 and 2, X represents an acid substituent. The acid substituent may be in the form of acid or a salt thereof depending on the type of compound used in the preparation process. The copolymer of the present invention is preferably an acid in order that it can be used for the electrolyte membrane. Accordingly, in the case where the acid substituent of the tri-block copolymer is prepared in the form of a salt of an acid, the salt may be converted into an acid through addition of an acidic solution.

That is, in the case where X is $—SO^{3-}M^+$, $—COO^-M^+$, $—PO_3H^-M^+$ or $—PO_3^{2-}2M^+$, the tri-block copolymer may be prepared in the form of an electrolyte membrane by adding hydrochloric acid or sulfuric acid to a copolymer and converting a salt of an acid by the acid (protonation). At this time, preferably, the acidic solution is added to the tri-block copolymer in a concentration of 0.5 to 10 M and treated for 1 to 24 hours. In the case where the tri-block copolymer of the present invention is used for an electrolyte membrane for fuel cells, sulfonate is generally substituted by sulfonic acid.

In addition, the present invention also provides a fuel cell comprising: a stack including a plurality of membrane electrode assemblies, in which electrodes are adhered to both ends of the electrolyte membrane according to claim 6, laminated such that a separator is interposed between the two adjacent membrane electrode assemblies; a fuel supplier to supply fuel to the stack; and an oxidizing agent supplier to supply an oxidizing agent to the stack.

A general structure and manufacturing method of fuel cells are known in the art and a more detailed description thereof will thus be omitted herein.

Advantageous Effects

As apparent from the fore-going, the tri-block copolymer of the present invention has a structure of t-P-N-P-t or t-N-P-N-t, has a low ionic exchange capacity and thus low water uptake, exhibits superior dimensional stability and maintains superior fuel cell performance, in the case where the tri-block copolymer is used for an electrolyte membrane for fuel cells.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a graph showing measurement results of performance of a unit cell as a function of an ionic exchange capacity, for electrolyte membranes of Examples 1 to 2 and Comparative Example 1 in Experimental Example.

BEST MODE

Now, the present invention will be described in more detail with reference to the following Examples. These examples are provided only for illustrating the present invention and should not be construed as limiting the scope and spirit of the present invention.

Example 1

Preparation of Polar Moiety-Containing Copolymer Block to Which an End-Forming Monomer is Linked 1 eq. of a hydroquinonesulfonic acid potassium salt, 0.97 eq. of 4,4'-difluorobenzophenone, 0.025 eq. of p-cresol and 0.02 eq. of [3,5-bis(4-fluorobenzoyl)phenyl](4-fluorophenyl)methanone) were added to a 1 L reactor equipped with a Dean-Stark trap and a condenser, dimethyl sulfoxide (DMSO) and benzene were added as solvents and reaction was initiated under a nitrogen atmosphere using potassium carbonate as a catalyst. The reaction mixture was stirred in an oil bath at a temperature of 140° C. for 4 hours. The benzene was distilled, water was removed in the form of an azeotrope with the benzene by a molecular sieves of the Dean-Stark trap, the reaction temperature was elevated to 180° C. and condensation polymerization was performed for 20 hours.

The weight average molecular weight of polar moiety-containing copolymer block prepared was about 150,000 g/mol.

Preparation of Non-Polar Moiety-Containing Copolymer Block and Tri-Block Copolymer After reaction, the reaction product was cooled to 60° C., 0.34 eq. of 4,4'-difluorobenzophenone, 0.335 eq. of 9,9-bis(4-hydroxyphenyl)fluorene) and 0.005 eq. of [3,5-bis(4-fluorobenzoyl)phenyl](4-fluorophenyl)methanone) were added to the reactor and reaction was re-initiated under a nitrogen atmosphere using dimethyl sulfoxide (DMSO) and benzene as solvents and potassium carbonate as a catalyst. The reaction mixture was stirred in an oil bath at a temperature of 140° C. for 4 hours. The benzene was distilled, water was removed in the form of an azotropic mixture in the molecular sieves of the Dean-Stark trap, the reaction temperature was elevated to 180° C. and condensation polymerization was performed for 20 hours.

Next, the reaction mixture was cooled to ambient temperature, DMSO was further added thereto to dilute the reaction mixture and the diluted product was poured into excess methanol to separate the copolymer from solvent. Then, the excess potassium carbonate was removed with water, the residue was filtered and the resulting copolymer was dried in a vacuum oven at 80° C. for 12 hours or longer to prepare a tri-block copolymer in which the polar moiety-containing copolymer block is chemically bonded to both ends of the non-polar moiety-containing copolymer block.

The weight average molecular weight of the tri-block copolymer prepared was about 450,000 g/mol.

The tri-block copolymer prepared has a t-P-N-P-t structure and in this example, a molar ratio of b/a was 0.015 and a molar ratio of y/x was 0.02.

Example 2

A tri-block copolymer was prepared in the same manner as in Example 1, except that 1 eq. of a hydroquinonesulfonic acid potassium salt, 0.97 eq. of 4,4'-difluorobenzophenone and 0.02 eq. of [3,5-bis(4-fluorobenzoyl)phenyl](4-fluorophenyl)methanone) were used in the process of preparing the polar moiety-containing copolymer block, and 0.3 eq. of 4,4'-difluorobenzophenone, 0.295 of 9,9-bis(4-hydroxyphenyl)fluorene) and 0.005 eq. of [3,5-bis(4-fluorobenzoyl)phenyl](4-fluorophenyl)methanone) were used in the process of preparing the non-polar moiety-containing copolymer block.

The weight average molecular weight of polar moiety-containing copolymer block was about 150,000 g/mol and the weight average molecular weight of tri-block copolymer prepared was about 450,000 g/mol.

The tri-block copolymer thus prepared has a t-P-N-P-t structure and in this example, a molar ratio of b/a was 0.017 and a molar ratio of y/x was 0.02.

Example 3

Preparation of Non-Polar Moiety-Containing Copolymer Block to Which an End-Forming Monomer is Linked 0.97 eq. of 4,4'-difluorobenzophenone, 1 eq. of 9,9-bis(4-hydroxyphenyl)fluorene), 0.02 eq. of [3,5-bis(4-fluorobenzoyl)phenyl](4-fluorophenyl)methanone) and 0.025 eq. of p-cresol were added to a 1 L reactor equipped with a Dean-Stark trap and a condenser, dimethyl sulfoxide (DMSO) and benzene were added as solvents, and reaction was initiated under a nitrogen atmosphere using potassium carbonate as a catalyst. The reaction mixture was stirred in an oil bath at a temperature of 140° C. for 4 hours. The benzene was distilled, water was removed in the form of an azeotrope with the benzene by the molecular sieves of the Dean-Stark trap, the reaction temperature was elevated to 180° C. and condensation polymerization was performed for 20 hours.

The weight average molecular weight of non-polar moiety-containing copolymer block was about 160,000 g/mol.

Preparation of Polar Moiety-Containing Copolymer Block and Tri-Block Copolymer

After reaction, the reaction product was cooled to 60° C., 1.6 eq. of 4,4'-difluorobenzophenone, 1.605 eq. of 9,9-bis(4-hydroxyphenyl)fluorene) and 0.005 eq. of [3,5-bis(4-fluorobenzoyl)phenyl](4-fluorophenyl)methanone) were added to the reactor and reaction was re-initiated under a nitrogen atmosphere using dimethyl sulfoxide (DMSO) and benzene as solvents and using potassium carbonate as a catalyst. The reaction mixture was stirred in an oil bath at a temperature of 140° C. for 4 hours. The benzene was distilled off, water was removed in the form of an azeotrope with the benzene by the molecular sieves of the Dean-Stark trap, the reaction temperature was elevated to 180° C. and condensation polymerization was performed for 20 hours.

Then, the reaction mixture was cooled to ambient temperature, DMSO was further added thereto to dilute the reaction mixture and the diluted product was poured to excess methanol to separate a copolymer from the solvent. Then, the excess potassium carbonate was removed with water, the residue was filtered and the resulting copolymer was dried in a vacuum oven at 80° C. for 12 hours or longer to prepare a tri-block copolymer in which the non-polar moiety-containing copolymer block is chemically bonded to both ends of the polar moiety-containing copolymer block.

The weight average molecular weight of tri-block copolymer prepared was about 480,000 g/mol.

The tri-block copolymer prepared has a t-N-P-N-t structure and in this example, a molar ratio of b/a was 0.02 and a molar ratio of y/x was 0.0031.

Comparative Example 1

A multi-block copolymer was prepared in the same manner as in Example 1, except that 0.95 eq. of a hydroquinonesulfonic acid potassium salt, 0.97 eq. of 4,4'-difluorobenzophenone and 0.02 eq. of [3,5-bis(4-fluorobenzoyl)phenyl](4-fluorophenyl)methanone) were used in the process of preparing the polar moiety-containing copolymer block, and 0.23 eq. of 4,4'-difluorobenzophenone, 0.2876 of 9,9-bis(4-hydroxyphenyl)fluorene) and 0.005 eq. of [3,5-bis(4-fluorobenzoyl)phenyl](4-fluorophenyl)methanone) were used in the process of preparing the non-polar moiety-containing copolymer block.

Comparative Example 2

A tri-block copolymer was prepared in the same manner as in Example 1, except that [3,5-bis(4-fluorobenzoyl)phenyl] (4-fluorophenyl)methanone) as the monomer containing a side chain was not used in the processes of preparing the polar moiety-containing copolymer block and the non-polar moiety-containing copolymer block; 1 eq. of the hydroquinone-sulfonic acid potassium salt, 1 eq. of 4,4'-difluorobenzophenone and 0.025 eq. of p-cresol were used in the process of preparing the polar moiety-containing copolymer block; and 0.31 eq. of 4,4'-difluorobenzophenone and 0.2975 eq. of 9,9-bis(4-hydroxyphenyl)fluorene) were used in the process of preparing the non-polar moiety-containing copolymer block.

Experimental Example

Preparation of Electrolyte Membrane for Fuel Cells

The block copolymers synthesized in Examples and Comparative Examples were fully dissolved to a weight ratio of 3 to 15 wt % in N,N-dimethylacetamide (DMAc) as a solvent and filtered to prepare a solution for film casting. The polymer film was cast on a glass substrate using a doctor blade on a surface plate of applicator at a clean bench at 40° C., was allowed to stand for 24 hours, placed in an oven at 200° C. and allowed to stand for 24 hours.

Then, the glass substrate taken out of the oven was immersed in water for a moment and the cast polymer film was separated from the glass substrate. The polymer electrolyte film thus prepared was immersed in an 80% sulfuric aqueous acid solution at 80° C. for 2 hours or longer to convert potassium sulfonate of the polymer into sulfonic acid and washed with distilled water to remove acid residue present on the surface of the polymer film to thereby prepare a polymer electrolyte membrane for fuel cells.

Evaluation of Water Uptake

Water uptake in accordance with an ionic exchange capacity of electrolyte membranes prepared in Examples 1 to 3 and Comparative Examples 1 and 2 was measured and the results thus obtained are shown in Table 1 below:

TABLE 1

| | Type | Ionic exchange capacity (meq/g) | Water uptake (%) | |
|---|---|---|---|---|
| Ex. 1 | Tri-block | 1.33 | 36.5 | P-N-P |
| Ex. 2 | Tri-block | 1.44 | 45.2 | P-N-P |
| Ex. 3 | Tri-block | 1.12 | 24.2 | N-P-N |
| Comp. Ex. 1 | Tri-block | 1.61 | 57.4 | — |
| Comp. Ex. 2 | Tri-block | — | — | No formation of film |

As can be seen from Table 1, the tri-block copolymer of the present invention exhibits low water uptake and thus superior dimensional stability, as compared to multi-block copolymers.

Evaluation of Unit Cell Performance

Unit cell performance as a function of an ionic exchange capacity of electrolyte membranes prepared in Examples 1 to 3 and Comparative Examples 1 and 2 was measured and the results thus obtained are shown in FIG. 1.

As can be seen from FIG. 1, the electrolyte membranes of Examples according to the present invention exhibit unit cell performance comparable to the electrolyte membrane of Comparative Example 1.

That is, the electrolyte membrane prepared from the tri-block block copolymer of the present invention exhibits low water uptake and thus superior dimensional stability, as compared to multi-block copolymers, but exhibits superior cell performance as electrolyte membranes comparable to electrolyte membranes made of multi-block copolymers.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A tri-block copolymer, as a polymer electrolyte membrane for fuel cells, having a t-P-N-P-t or t-N-P-N-t molecular structure,
   wherein t represents an end of a polymer formed by an end-forming monomer, p represents a copolymer block having a polar moiety, and N represents a copolymer block having a non-polar moiety, and
   wherein the tri-block copolymer has a weight average molecular weight of 100,000 to 1,000,000 g/mol.

2. The tri-block copolymer according to claim 1, wherein P represents a copolymer block represented by Formula 1 below and N represents a copolymer block represented by Formula 2 below:

(1)

(2)

wherein A, C and V are each independently at least one selected from the group consisting of:

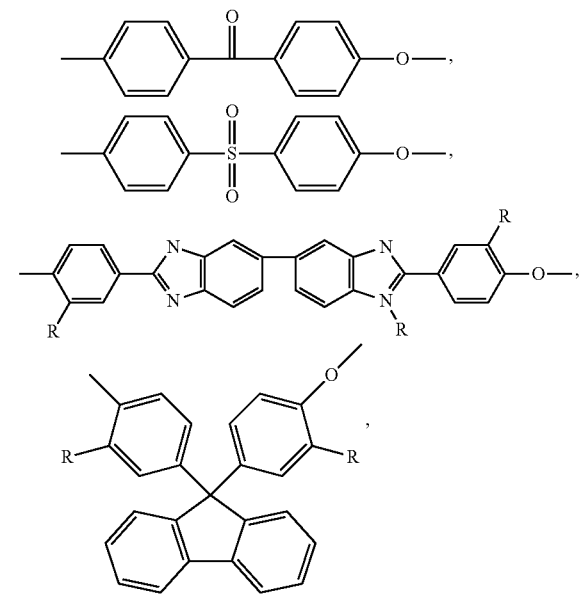

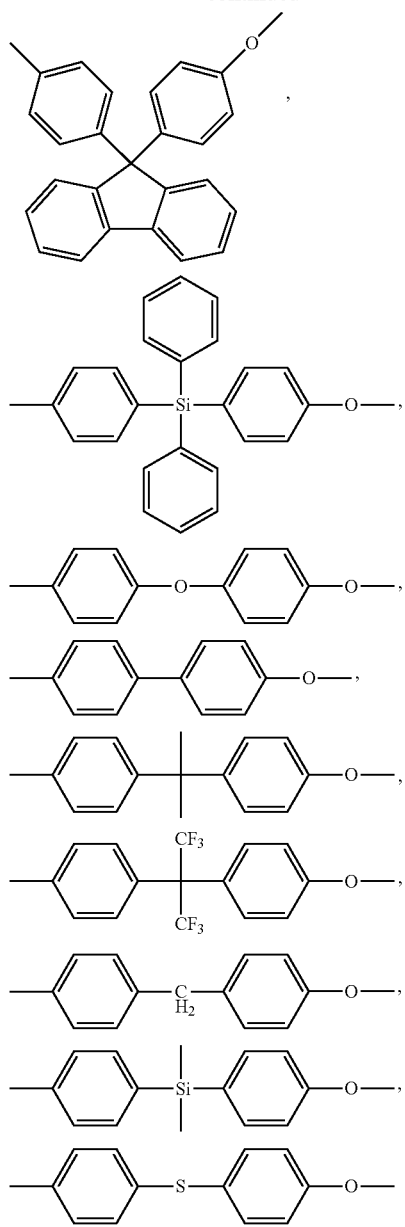
R is —NO₂ or —CF₃;
U is at least one selected from the group consisting of:
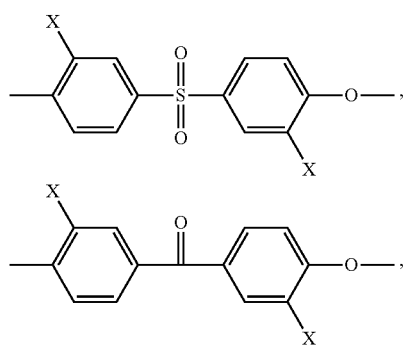
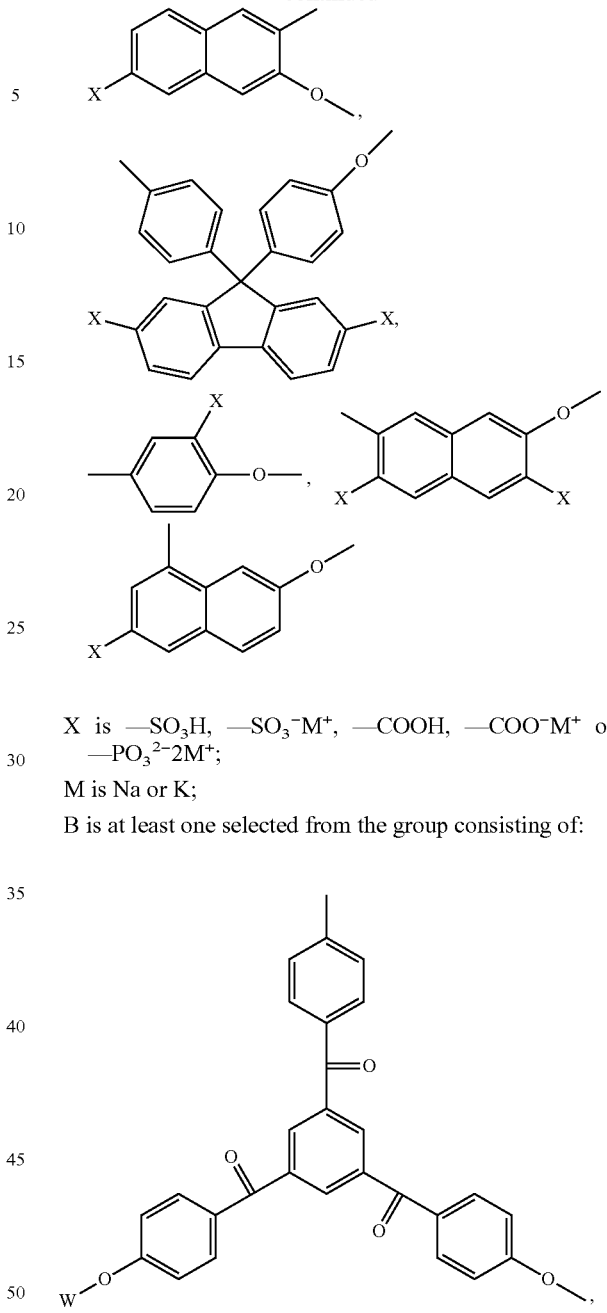
X is —SO₃H, —SO₃⁻M⁺, —COOH, —COO⁻M⁺ or —PO₃²⁻2M⁺;
M is Na or K;
B is at least one selected from the group consisting of:
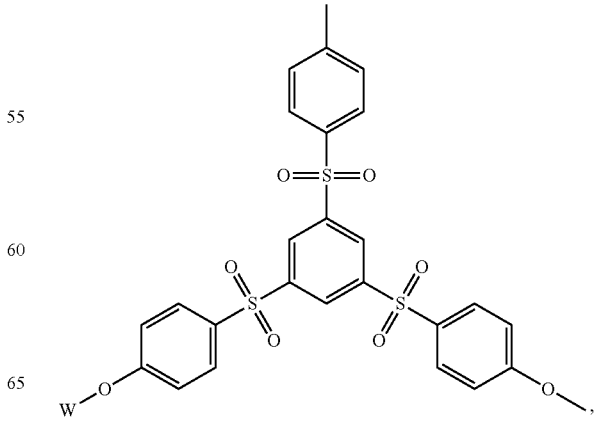

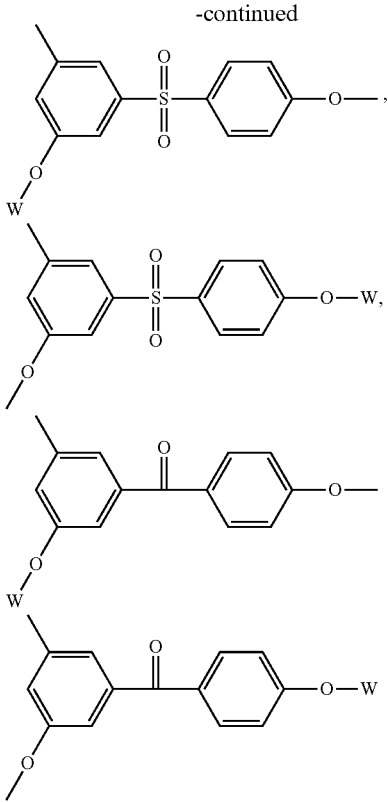

W is the same as defined in U in Equation 1 and V in Equation 2;
x:y is 1000:1 to 5:1, a:b is 1000:1 to 5:1; and
10≤m≤2000 and 5≤n≤800.

3. An electrolyte membrane comprising the tri-block block copolymer according to claim 2 wherein N, Na or K, is substituted by H.

4. A fuel cell comprising:
   a stack including a plurality of membrane electrode assemblies, in which electrodes are adhered to both ends of the electrolyte membrane according to claim 3, laminated such that a separator is interposed between the two adjacent membrane electrode assemblies;
   a fuel supplier to supply a fuel to the stack; and
   an oxidizing agent supplier to supply an oxidizing agent to the stack.

5. The tri-block copolymer according to claim 1, wherein t is each independently at least one selected from the group consisting of p-cresol, phenoxy, benzophenone and methoxy groups.

6. An electrolyte membrane comprising the tri-block block copolymer according to claim 5 wherein N, Na or K, is substituted by H.

7. A fuel cell comprising:
   a stack including a plurality of membrane electrode assemblies, in which electrodes are adhered to both ends of the electrolyte membrane according to claim 6, laminated such that a separator is interposed between the two adjacent membrane electrode assemblies;
   a fuel supplier to supply a fuel to the stack; and
   an oxidizing agent supplier to supply an oxidizing agent to the stack.

8. The tri-block copolymer according to claim 1, wherein the weight average molecular weight of polar moiety-containing copolymer block is 3,500 to 350,000 g/mol.

9. An electrolyte membrane comprising the tri-block block copolymer according to claim 8 wherein N, Na or K, is substituted by H.

10. A fuel cell comprising:
    a stack including a plurality of membrane electrode assemblies, in which electrodes are adhered to both ends of the electrolyte membrane according to claim 9, laminated such that a separator is interposed between the two adjacent membrane electrode assemblies;
    a fuel supplier to supply a fuel to the stack; and
    an oxidizing agent supplier to supply an oxidizing agent to the stack.

11. The tri-block copolymer according to claim 1, wherein the weight average molecular weight of the nonpolar moiety-containing copolymer block is 3,000 to 400,000 g/mol.

12. An electrolyte membrane comprising the tri-block block copolymer according to claim 11 wherein N, Na or K, is substituted by H.

13. A fuel cell comprising:
    a stack including a plurality of membrane electrode assemblies, in which electrodes are adhered to both ends of the electrolyte membrane according to claim 12, laminated such that a separator is interposed between the two adjacent membrane electrode assemblies;
    a fuel supplier to supply a fuel to the stack; and
    an oxidizing agent supplier to supply an oxidizing agent to the stack.

14. An electrolyte membrane comprising the tri-block block copolymer according to claim 1 wherein N, Na or K, is substituted by H.

15. A fuel cell comprising:
    a stack including a plurality of membrane electrode assemblies, in which electrodes are adhered to both ends of the electrolyte membrane according to claim 14, laminated such that a separator is interposed between the two adjacent membrane electrode assemblies;
    a fuel supplier to supply a fuel to the stack; and
    an oxidizing agent supplier to supply an oxidizing agent to the stack.

* * * * *